Patented May 29, 1945

2,376,914

UNITED STATES PATENT OFFICE 2,376,914

ZEOLITE REGENERATION

Hilding B. Gustafson, Chicago, Ill., assignor to Infilco Incorporated, Chicago, Ill., a corporation of Delaware No Drawing. Application February 10, 1941, Serial No. 378,250

9 Claims. (Cl. 210—24)

This invention relates to an improved method of softening water.

One of the objects of this invention is to provide an improved method of water softening.

Another object of the invention is to provide an improved method of regenerating zeolite.

A still further object of the invention is to provide an improved method of regenerating a mixture of hydrogen and sodium zeolite.

Another object of the invention is to provide an improved method of treating water with hydrogen zeolite, or both hydrogen and sodium zeolite.

Another object of this invention is to reduce the alkalinity of water treated with hydrogen zeolite.

A still further object of this invention is to reduce the amount of salt necessary to regenerate a mixture of hydrogen and sodium zeolite.

An additional object of this invention is to reduce the hardness of water treated with a mixture of hydrogen zeolite and sodium zeolite.

Other objects of the invention will be apparent from the description and claims which follow.

For many years hard waters have been softened by treating with siliceous zeolite by means of which the calcium and magnesium salts in solution are replaced with the corresponding sodium salts, a calcium or magnesium ion being substituted for the sodium ion of the zeolite. This method removes substantially all of the calcium and magnesium ions in solution but, as it does not reduce the total dissolved solids, it has some disadvantages.

A more recent development has been the use of carbonaceous zeolites to exchange sodium for calcium or magnesium ions in solution or to substitute hydrogen for calcium, magnesium and sodium. In the former case the zeolite softens water in the same manner as the older siliceous zeolites, a typical reaction for which follows:

$$Ca(HCO_3)_2 + Na_2Z \rightarrow CaZ + 2NaHCO_3$$

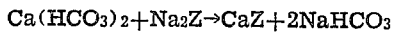

(in which Z denotes the remainder of the zeolite molecule).

The above reaction is reversible so that after the effectiveness of the zeolite has been exhausted it can be regenerated by treating the resulting calcium zeolite with an excess of a sodium salt of a strong mineral acid, preferably sodium chloride because of its cheapness. In the regeneration process the sodium ion of the salt replaces the calcium and magnesium ions of the exhausted zeolite—calcium and magnesium chlorides being washed away.

In the use of a hydrogen zeolite, the hydrogen ion becomes exchanged for the calcium, magnesium and sodium ions of the salt in solution, thereby forming calcium, magnesium and sodium zeolite respectively and the acid corresponding to the particular salt. The salts most commonly in solution are bicarbonates, sulphates and chlorides. A typical reaction is shown in the following equation involving the treatment of a water containing a bicarbonate:

$$2NaHCO_3 + H_2Z \rightarrow Na_2Z + 2H_2CO_3$$

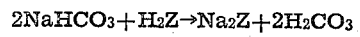

Carbonic acid formed by this reaction is unstable and readily decomposes into carbon dioxide and water, so that the end result is the substitution of the metal of the salt in solution for the hydrogen in the zeolite and the formation of water and carbon dioxide, the latter of which is readily driven off. It is therefore seen that the use of the hydrogen zeolite removes bodily the carbonates and bicarbonates of sodium as well as those of magnesium and calcium thereby reducing the total dissolved solids in, and the alkalinity of, the original water.

When the salts in solution are sulphates and chlorides the acid formed by the treatment with hydrogen zeolite are, of course, sulphuric and hydrochloric acid respectively. This is undesirable because these acids are not readily decomposed and they are very detrimental because of their corrosive character. However, with the close adjustment of the operation and the amount of regenerating acid used, it is possible to make the zeolite selective in its hydrogen exchange. That is, it is possible to secure as complete conversion as may be desired of the carbonates and bicarbonates to carbonic acid without converting any of the sulphates and chlorides to sulphuric and hydrochloric acid respectively. It is thus possible to secure an effluent which is actually alkaline throughout the run, the amount of residual alkalinity being controlled within rather narrow limits. This is, of course, very important as the treated water is less corrosive than otherwise, and also because, since this condition is secured by treating the zeolite with a reduced amount of acid, a considerable saving in the cost of regeneration is effected.

It is well known that both sodium zeolite and hydrogen zeolite can be regenerated when exhausted. The regeneration of sodium zeolite has already been mentioned. The regeneration of a hydrogen zeolite is similar except that a dilute acid solution is substituted for the brine. Exhausted hydrogen zeolite is completely regenerated by washing with an excess of dilute strong mineral acid, such as sulphuric or hydrochloric, the hydrogen ion replacing the sodium, magnesium and calcium ions united with the zeolite, the respective sodium, magnesium and calcium salts being washed away in the process. In the controlled operation in which hydrogen zeolite is used to bodily remove only carbonates and bicarbonates, it has been proposed to use just a sufficient quantity of regenerating acid to secure complete conversion of the carbonates and bicarbonates to carbonic acid without converting the sulphates and chlorides to sulphuric and hydrochloric acid.

In the past, the effluent from the hydrogen zeolite bed was then passed through a bed of sodium zeolite to replace the magnesium and calcium of other salts in solution, such as sulphates and chlorides, with sodium. The use of a single bed of zeolite has also been proposed, the bed in this case being composed partly of hydrogen zeolite and partly of sodium zeolite, the exact proportion of each depending upon the amount of the respective salts in the raw water. In either method the hardness of the final effluent will approach zero, the carbonates and bicarbonates will be bodily removed and the total dissolved mineral content reduced accordingly, and a non-acid water results.

It has been the recommended practice heretofore to regenerate a bed of combined sodium and hydrogen zeolite by passing a mixture of dilute acid, usually sulphuric or hydrochloric, and dilute sodium chloride brine over the zeolite bed. The proportion of acid to brine of course depended upon the character of the water to be treated. I have found that by regenerating in this method the control was not entirely accurate. I have found that by regeneration by the usually accepted means alkalinity and hardness vary to some extent and much greater quantities of regenerating liquor are necessary than theoretically should be. I have found that if the amount of acid necessary to regenerate the desired quantity of hydrogen zeolite is first passed through the bed of zeolite and then immediately followed by the dilute brine solution, three unexpected results are secured: A substantially reduced amount of sodium chloride is necessary for regeneration; the alkalinity spread of the effluent is considerably reduced; and the degree of hardness of resulting water is also considerably reduced. This is shown by the following comparative tests:

A bed of carbonaceous zeolite of approximately 10 to 50 mesh screen size was prepared in a 1.8" diameter by 5' long glass tube, the volume of the bed being 1500 cc. After thorough backwashing to remove fines and entrained air, the unit was operated downflow with a water of the following characteristics:

| | Parts per million |
|---|---|
| Alkalinity | 360 |
| Hardness | 416 |
| Non-carbonate solids | 85 |

When the effectiveness of the zeolite was exhausted the run was stopped, the unit backwashed and regenerated with a solution prepared by mixing 1 liter of 4% sodium chloride solution with 13.6 cc. of 66° sulphuric acid and diluting the mixture to 2500 cc. This mixed acid and salt solution was passed downwardly through the bed in a period of 15 minutes and was followed by a 15 minute water wash at the same rate of flow. The rate of flow was then increased to the normal operating rate of 405 cc. per minute, corresponding to 6 gallons per minute per square foot area. Several runs were made and a series of tests made throughout each run. It was found that the alkalinity varied from 30 parts per million at the beginning of a run to a maximum of 53 parts per million at about the middle of a run to a minimum of a —3 parts per million at the end of the run. The hardness increased gradually from 0 part per million at the beginning of the run to a maximum of 29 parts per million at the end of the run. The method of regeneration followed in this test was that considered by experts as the best in the art.

The unit was now regenerated in accordance with my new invention. A solution of sulphuric acid prepared by diluting 13.6 cc. of 66° sulphuric acid with 2500 cc. of water was passed downwardly through the bed in a period of 15 minutes. This amount of acid was the theoretical amount necessary to secure the selective action of removing carbonates and bicarbonates without changing the chlorides and sulphates. When the last of the sulphuric acid solution coincided with the upper level of the bed, a solution of sodium chloride prepared by diluting 700 cc. of 4% sodium chloride solution with 1200 cc. of water was applied at the same rate of flow. The sodium chloride solution was followed by a 15 minute water wash at the same rate of flow, after which the normal operating rate of 405 cc. per minute was established. Quantities of the original hard water were passed through the regenerated bed similar to those passed through in the original test. Tests made throughout the run showed that in the effluent the alkalinity varied from a minimum of 30 parts per million to a maximum of 50 parts per million—a spread of only 20 as compared with a spread of 56 in the previous test—and that the hardness was 0 part per million throughout the run. It is therefore apparent that by means of the regeneration disclosed in this invention namely, regenerating with the dilute acid and then with the dilute brine in sequence, the alkalinity spread is drastically reduced and increased effectiveness is secured in so far as hardness is concerned.

Subsequently the same method of regeneration was used with reduced quantities of salt being used. The sodium chloride was reduced from 700 cc. to 425 cc. of 4% sodium chloride solution to 1200 cc. of water. Other than the change in the strength of the sodium chloride solution, conditions remained the same as in the preceding run. Tests with the weaker brine showed an effluent alkalinity spread from a minimum of 18 parts per million to a maximum of 26 parts per million and a maximum hardness of 2 parts per million.

It might be mentioned that the amount of acid used for regeneration was the stoichiometrical amount necessary to remove the carbonates and bicarbonates from the raw water. The amount of brine necessary is somewhat in excess of the theoretical amount necessary to regenerate the balance of the bed, although much less than previously required.

It is therefore evident that by treating the zeolite bed in sequence, first with the acid, and secondly with the sodium chloride solution, and using a weaker sodium solution than had heretofore been necessary for regeneration of a similar bed, the effluent alkalinity was greatly reduced, the amount of the alkalinity spread was reduced from 56 (old method) to 8 (new method) and the maximum hardness was reduced from 29 parts per million (old method) to 2 parts per million (new method).

Further tests were conducted involving regeneration with the sequence reversed, namely, first regenerating with the sodium chloride solution and then with the acid solution. In these tests the regeneration was similar in time and quantity to those mentioned above, only the sequence of acid and brine regeneration being changed. It was found that the results of this type of regeneration were superior to the old method but were somewhat inferior to the regeneration first by the acid and secondly by brine. Runs using zeolite regenerated first by the brine and secondly by the acid disclosed that hardness was not removed for as long a period of time by this method although the alkalinity was approximately the same by both processes. An illustration of the differences is shown in the following tabulation (in which the figures show parts per million) based upon tests using both methods of regeneration:

*Regenerated by brine followed by acid*

|            | Zero | 10 min. | 70 min. | 100 min. | 120 min. | 150 min. |
|------------|------|---------|---------|----------|----------|----------|
| Alkalinity | 15   | 17      | 15      | 13       | 13       | 6        |
| Hardness   | 0    | 0       | 0       | 0        | 4        | 52       |

*Regenerated by acid followed by brine*

|            | Zero | 10 min. | 70 min. | 100 min. | 120 min. | 150 min. |
|------------|------|---------|---------|----------|----------|----------|
| Alkalinity | 11   | 19      | 17      | 17       | 14       | 13       |
| Hardness   | 3    | 0       | 0       | 0        | 0        | 0        |

It will be seen from this series of tests that by the process of my invention, the following important results are secured: the amount of sodium chloride required is substantially reduced; a substantially lower degree of hardness is secured; and objectionable effluent alkalinity spread is avoided.

In this application the term "zeolite" is used in its broad sense to mean any anion or cation exchange material. "Zeolite" is therefore intended to include carbonaceous material having such exchange properties, although in some technical aspects such material is not a true zeolite. In some instances a distinction has been made between "hydrogen zeolite" and "sodium zeolite." Both are used in their ordinary meaning: "hydrogen zeolite" to indicate any material, including carbonaceous, having the property of exchanging a hydrogen ion for other cations; and "sodium zeolite" to indicate any material, including carbonaceous, having the property of exchanging a sodium ion for other metallic ions, such as calcium or magnesium.

Manifestly many variations and modifications of the invention hereinbefore set forth may be made by a person skilled in the art without departing from the spirit and scope hereof. Accordingly the appended claims are to be given an interpretation commensurate with the novelty herein described and as broad as may be permitted by prior art.

I claim:

1. The method of regenerating a zeolite comprising sequentially contacting such zeolite with a dilute solution of a strong mineral acid and separately with a dilute solution of a sodium salt of a strong mineral acid.

2. The method of restoring the exchange capacity of an exhausted carbonaceous zeolite to selectively exchange cations comprising first treating such zeolite with an amount of a dilute solution of a strong mineral acid equivalent to the amount of carbonate and bicarbonate to be removed from a fluid to be treated therewith, and thereafter separately treating such acid treated zeolite with a solution of a sodium salt of a strong mineral acid slightly in excess of the amount equivalent to the mineral cations to be removed from such fluid to be treated therewith.

3. The method of regenerating the exchange capacity of exhausted carbonaceous zeolite comprising first treating said zeolite with a dilute solution of a sodium salt of a strong mineral acid in excess of the amount of hardness to be removed by sodium zeolite from a liquid to be treated therewith, and thereafter separately treating such treated zeolite with a dilute solution of a strong mineral acid equal to the amount of carbonates and bicarbonates to be removed from such liquid.

4. The method of regenerating a bed of exhausted carbonaceous zeolite comprising first passing therethrough a dilute solution of sulfuric acid containing an amount of said acid stoichiometrically equal to the amount of carbonates and bicarbonates to be removed from a liquid to be treated therewith and thereafter separately passing through such acid treated zeolite a dilute solution sodium chloride containing an amount of said salt slightly in excess stoichiometrically of the amount of hardness to be removed from such liquid.

5. The method of restoring the capacity of an exhausted bed of mixed hydrogen and sodium exchange carbonaceous zeolite to selectively exchange cations comprising first passing therethrough a dilute solution of sodium chloride containing an amount of said salt stoichiometrically in excess of the hardness to be removed by sodium zeolite from a liquid to be treated thereby and thereafter separately passing through such sodium chloride treated zeolite a dilute solution of sulfuric acid containing an amount of said acid stoichiometrically equal to the amount of carbonates and bicarbonates to be removed from such liquid by hydrogen exchange zeolite.

6. The method of regenerating the exchange capacity of an exhausted zeolite to provide a mixture of hydrogen and sodium zeolite comprising first treating said zeolite with a dilute solution of a strong mineral acid sufficient to regenerate a predetermined amount of such zeolite and thereafter separately passing through such acid treated zeolite a dilute solution of a sodium salt of a strong mineral acid sufficient to regenerate the balance of such zeolite.

7. The method of softening water comprising passing raw water through a bed of carbonaceous zeolite which has been regenerated by passing therethrough a dilute solution of a strong mineral acid equivalent to the amount of carbonates and bicarbonates to be removed from said water and thereafter separately passing therethrough a dilute solution of a sodium salt of a strong mineral acid slightly in excess of the theoretical amount equivalent to the amount of hardness to be removed from such water.

8. A water softening zeolite regenerated by first treating said zeolite with a dilute solution of a strong mineral acid equivalent to the amount of carbonates and bicarbonates to be removed by said zeolite from water to be treated therewith and subsequently treating such acid treated zeolite with a dilute solution of a sodium salt of a strong mineral acid slightly in excess of the theoretical amount required for the removal of calcium and magnesium from such water by the zeolite.

9. The method of treating water with a combined sodium and hydrogen zeolite comprising the steps of regenerating the zeolite first with a dilute solution of a strong mineral acid euqivalent to the amount of carbonates and bicarbonates to be removed from the water thereby and subsequently with a dilute solution of a sodium salt slightly in excess of the amount of hardness to be removed from the water, and treating the water with such regenerated zeolite.

HILDING B. GUSTAFSON.